United States Patent [19]

Pratt

[11] Patent Number: 4,808,111

[45] Date of Patent: Feb. 28, 1989

[54] MATHEMATICS EDUCATING DEVICE

[76] Inventor: William C. Pratt, 3909 South Gary Pla., Tulsa, Okla. 74105

[21] Appl. No.: 142,790

[22] Filed: Jan. 11, 1988

[51] Int. Cl.$^4$ .............................................. G09B 19/02
[52] U.S. Cl. ..................................... 434/191; 434/205
[58] Field of Search ............... 434/191, 205, 200, 193, 434/195

[56] References Cited

U.S. PATENT DOCUMENTS

| | | | |
|---|---|---|---|
| 367,223 | 7/1887 | Moody | 434/205 X |
| 1,244,000 | 10/1917 | Soltoft | 434/205 |
| 1,396,379 | 11/1921 | Moore | 434/205 X |
| 2,481,058 | 9/1949 | Zarlengo | 434/205 |
| 2,701,423 | 2/1955 | Merrill | 434/191 X |
| 2,839,843 | 6/1958 | Keyko | 434/193 |
| 2,842,870 | 7/1958 | Lilly | 434/205 |
| 2,971,275 | 2/1961 | Provenzano | 434/191 |
| 3,001,301 | 9/1961 | Carl | 434/205 |
| 3,290,798 | 12/1966 | Gilbert | 434/191 |
| 3,357,116 | 12/1967 | Bazacos | 434/193 |
| 3,924,859 | 12/1975 | Kramer | 434/191 X |
| 4,168,583 | 9/1979 | Halpern | 434/193 |

Primary Examiner—William H. Grieb
Attorney, Agent, or Firm—Laney, Dougherty, Hessin & Beavers

[57] ABSTRACT

A mathematics educating device includes a number rack having a plurality of number recesses; a plurality of number plates, each number plate bearing a numeral selected from the sequence 1, 2, 3, 4, 5, 6, 7, 8, 9, 1, 0; an operator rack having a plurality of operator recesses; a plurality of operator plates, each operator plate bearing a mathematical operator; and a practice rack having at least three number practice recesses and at least one operator practice recess arranged for vertical or horizontal addition, subtraction, multiplication, and division. Each number recess has a unique shape and each number plate bearing a different numeral has a unique shape so that each number plate bearing a different numeral will fit within only one number recess and all number plates bearing the same numeral will fit within the same number recess. Similarly, and for the same purposes, each operator recess has a unique shape and each operator plate bearing a different mathematical operator has a unique shape. Each number practice recess of the practice rack is shaped to receive any of the number plates and each operator practice recess of the practice racks is shaped to receive any of the operator plates. The number recesses are further identified by a quantity of indicia on the number rack near each number recess. The number plates are further identified by a quantity of indicia on each number plate.

14 Claims, 2 Drawing Sheets

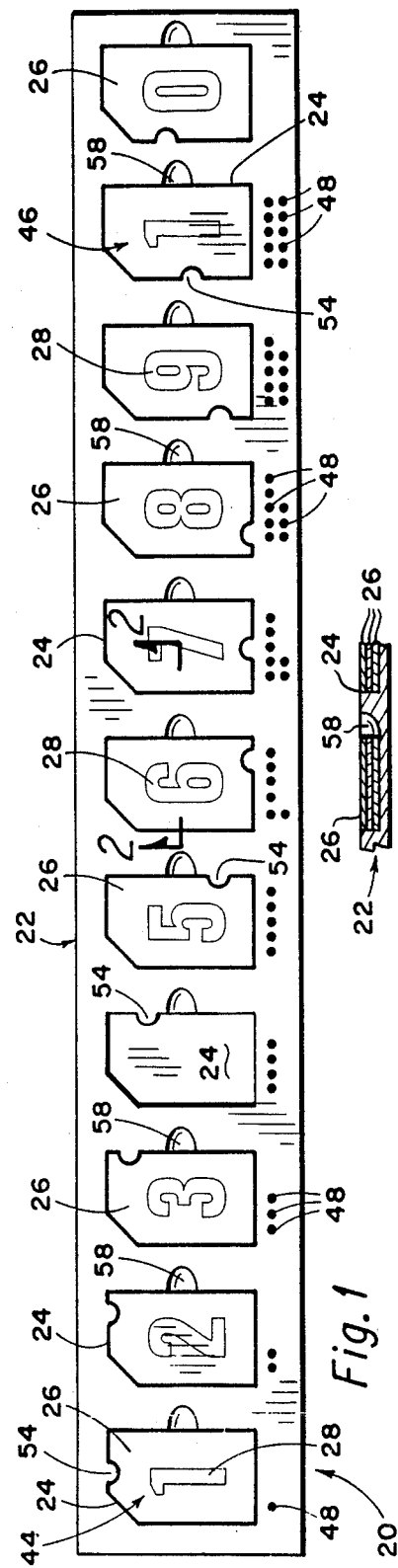

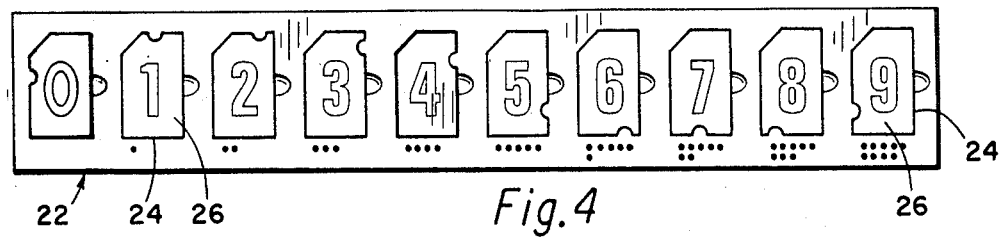
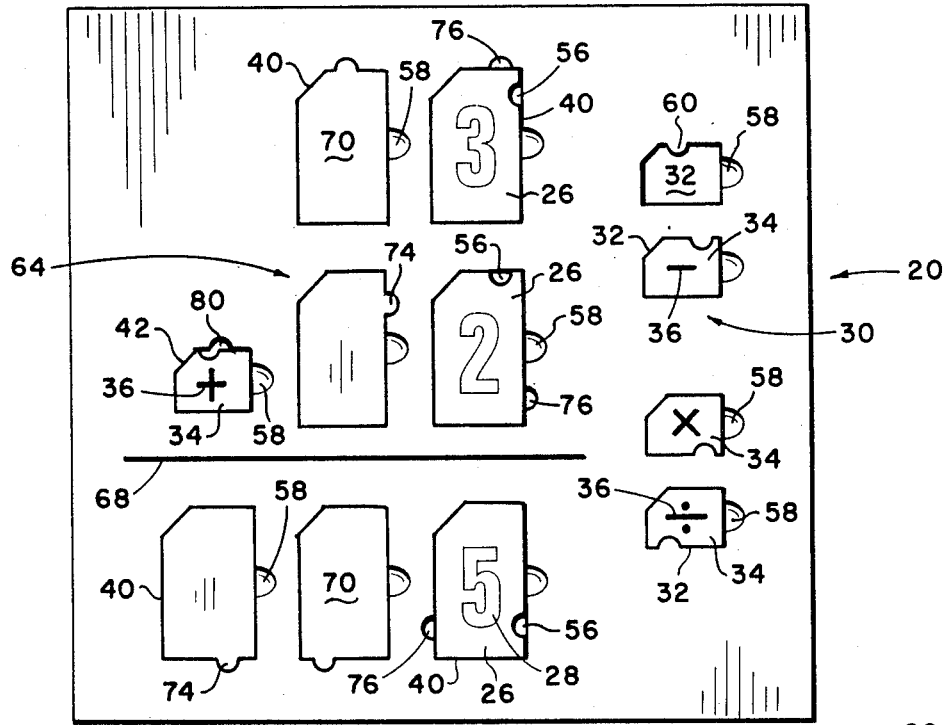
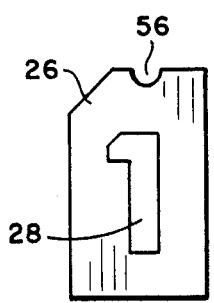
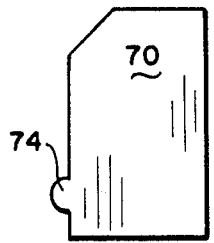
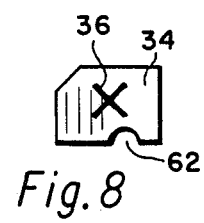
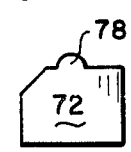
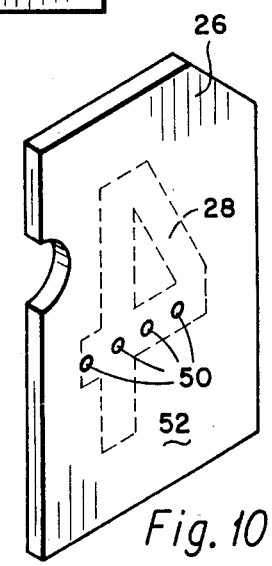

MATHEMATICS EDUCATING DEVICE

BACKGROUND OF THE INVENTION

This invention relates to mathematics educating devices and more particularly to such a device having number bearing plates, mathematical operator bearing plates, storage racks for organizing and storing the plates, and practice racks having recesses arranged to receive the plates in order to demonstrate and practice vertical and horizontal mathematical calculations.

SUMMARY OF THE INVENTION

The mathematics educating device of the present invention includes a number rack having a plurality of number recesses; a plurality of number plates, each number plate bearing a numeral; an operator rack having a plurality of operator recesses; a plurality of operator plates, each operator plate bearing a mathematical operator; and a practice rack having at least three number practice recesses and at least one operator practice recess. The number practice recesses and operator practice recesses in the practice rack may be arranged for vertical or horizontal addition, subtraction, multiplication, and division. Each number recess has a unique shape and each number plate bearing a different numeral has a unique shape so that each number plate bearing a different numeral is uniquely shaped to fit within only one number recess and all number plates bearing the same numeral will fit within the same number recess. Similarly, each operator recess may have a unique shape and each operator plate bearing a different mathematical operator may have a unique shape so that each operator plate bearing a different operator is uniquely shaped to fit within only one operator recess and all operator plates bearing the same operator will fit within the same operator recess. The number practice recesses and operator practice recesses in the practice rack are shaped to receive any of the number plates and operator plates, respectively.

In a preferred embodiment, each number plate bears one numeral selected from the sequence 1, 2, 3, 4, 5, 6, 7, 8, 9, 1, 0. The number plates bearing the numeral "1" occurring first in the sequence are used to indicate the numeral "1" and the number plates bearing the numeral "1" occurring second in the sequence are used to indicate a ten's digit. At least two number plates bear each numeral from the sequence. A quantity of indicia may be provided on the number rack near each number recess, the quantity of indicia corresponding to the numeral on the number plate which fits within the respective number recess. Similarly, a quantity of indicia may be provided on each number plate, the quantity of indicia corresponding to the numeral borne by the number plate.

It is an object and advantage of the present invention to provide a mathematics educating device having uniquely shaped number recesses and uniquely shaped numeral bearing plates such that each numeral bearing plate bearing a different numeral is fitted or matched to and placeably received by only one number recess.

It is an object and advantage of the present invention to provide a mathematics educating device which will provide an organized storage of numeral bearing plates and which will teach an organized approach to a numbers system, particularly the Arabic number system.

It is an object and advantage of the present invention to provide uniquely shaped operator recesses and uniquely shaped mathematical operator bearing plates such that each operator bearing plate bearing a different operator is matched or fitted to and placeably received by only one operator recess.

It is an object and advantage of the present invention to provide a mathematics educating device having practice boards which include recesses which will interchangeably receive uniquely shaped numeral bearing plates and allow a user to freely create numbers and combination of numbers and to arrange the numbers in proper form for mathematical calculations.

It is an object and advantage of the present invention to provide a mathematics educating device having practice boards which include recesses which will interchangeably receive uniquely shaped mathematical operator bearing plates and allow a user to freely select and utilize different mathematical operators with the mathematics educating device.

It is an object and advantage of the present invention to provide a sequence of number bearing plates which will clearly demonstrate the "base ten" foundation of the Arabic numeral system.

It is an object and advantage of the present invention to provide a sequence of number plates which will clearly demonstrate the "base ten" foundation of the Arabic numeral system using a sequence of eleven numerals, being: 1, 2, 3, 4, 5, 6, 7, 8, 9, 1, 0.

It is an object and advantage of the present invention to provide a mathematics educating device which allows a user who can count but cannot identify Arabic numerals (as well as Roman numerals) to identify the numerals by counting; and to add, subtract, multiply, and divide by counting to identify the appropriate numeral and then placing the numeral in the mathematical orientation which will allow the desired calculation.

It is an object and advantage of the present invention to provide a mathematics educating device which will teach the youngest children (kindergarten, first grade, and second grade) the fundamentals of mathematics and simulate the thought process involved in learning fundamental mathematics.

It is an object and advantage of the present invention to provide a mathematics educating device which educates by a "hands-on" procedure in which the user thinks, and then physically chooses and performs a mathematical calculation in order to demonstrate the fundamental concepts of addition, subtraction, multiplication, and division.

It is an object and advantage of the present invention to provide a mathematics educating device which encourages a user to think and perform independently and to thereby rely upon their own methodological thought process.

It is an object and advantage of the present invention to provide a mathematics educating device which can be used to educate a person to identify and recognize numbers and to count fromm "1" to "10".

It is an object and advantage of the present invention to provide a mathematics educating device which requires a user to think, to choose on the basis of his thought process, and then to demonstrate actively, thereby advancing the thought process to motor function.

It is an object and advantage of the present invention to provide a mathematics educating device having number bearing plates and operator bearing plates which are uniquely shaped to placeably fit into storage racks of uniquely shaped number recesses and operator recesses in an organized manner which displays, demonstrates, and teaches the sequence of a numeral system and which makes a game of "cleaning-up" and storing the device.

BRIEF DESCRIPTION OF THE DRAWINGS

The present invention will be better understood by reference to the examples of the following drawings:

FIG. 1 is a plan view of a preferred embodiment of the number rack of the present invention;

FIG. 2 is a sectional view along line 2—2 of FIG. 1;

FIG. 3 is a plan view of a preferred embodiment of the horizontal practice rack and operator rack of the present invention;

FIG. 4 is a plan view of another embodiment of the number rack of the present invention;

FIG. 5 is a plan view of a preferred embodiment of the vertical practice rack and operator rack of the present invention;

FIG. 6 is a plan view of a preferred embodiment of the number plates of the present invention;

FIG. 7 is a plan view of a preferred embodiment of the blank number plates of the present invention;

FIG. 8 is a plan view of a preferred embodiment of the operator plates of the present invention;

FIG. 9 is a plan view of a preferred embodiment of the blank operator plates of the present invention; and FIG. 10 is a perspective view of a preferred embodiment of the reverse side of the number plates of the present invention.

DETAILED DESCRIPTION OF THE PREFERRED EMBODIMENTS

Before explaining the present invention in detail, it is to be understood that the invention is not limited to the details of construction and arrangement of parts illustrated in the accompanying drawings, since the invention is capable of other embodiments and of being practiced and carried out in various ways commensurate with the claims herein. Also, it is to be understood that the terminology employed herein is for the purpose of description and not of limitation.

FIGS. 1-10 present a preferred embodiment of a mathematics educating device, generally designated 20, which exemplifies the present invention. The illustrated embodiment is used for practicing the simplest arithmetic calculations with the simplest number groups. It is intended to be understood from this description that the device 20 may be easily modified to accommodate much more complex mathematics using much larger number groupings and extended mathematical equations.

Referring to the example of FIGS. 1, 3, and 5, the invention may be described as being generally comprised of a number rack, generally designated 22, having a plurality of number recesses 24; a plurality of number plates, generally designated 26, each number plate 26 bearing a numeral 28; an operator rack, generally designated 30, having a plurality of operator recesses 32; a plurality of operator plates, generally designated 34, each operator plate bearing a mathematical operator 36; and a practice rack, generally designated 38, having at least three number practice recesses 40 and at least one operator practice recess 42.

In the preferred embodiment, referring to FIGS. 6 and 10, each number recess 24 has a unique shape. Each number plate 26 bearing a different numeral 28 also has a unique shape and is uniquely shaped to fit within only one number recess 24. All of the number plates 26 bearing the same, or identical, numeral should fit within the same number recess 24. For example, the number plate 26 bearing the numeral "2" should placeably fit within only one number recess 24 and all other number plates 26 bearing the numeral "2" should fit in the same number recess 24. Referring to FIG. 2, in the preferred embodiment the number recesses 24 are made with sufficient depth that multiple number plates 26 bearing identical numerals may be stacked or placed one on top of another in the number recesses 24 with the numeral 28 of the top number plate 26 in full display (as exemplified in FIG. 1).

Referring to FIG. 4, there should be at least ten number plates 26 and at least ten number recesses 24 in the number rack 22. This will allow at least one number plate to bear each numeral in the sequence 0, 1, 2, 3, 4, 5, 6, 7, 8, 9, and will allow one unique number recess 24 to display and store each number plate 26 bearing a different numeral. This sequence of ten number plates 26 will allow a user of the educating device 20 to create all possible whole number combinations.

Referring to FIG. 1, in the preferred embodiment, eleven number recesses 24 are provided and at least eleven number plates 26 are provided. Each number plate 26 bears one numeral selected from the sequence 1, 2, 3, 4, 5, 6, 7, 8, 9, 1, 0. The first number plate 26 bearing the numeral "1", generally designated 44 in the drawings, is used to indicate the numeral "1". The other, or second number plate 26 bearing the numeral "1", generally designated 46 in the drawings, is used to indicate a ten's digit, i.e., is used to indicate a ten's digit such as found in numbers between 10 and 19. The second numeral "1" plate 46 (ten's digit) is given a unique shape and a unique number recess 24 to emphasize the distinction between the numeral "1" and the ten's digit or "base ten". Preferably, there are at least twenty-two number plates 26 with each number plate bearing one numeral selected from the sequence 1, 2, 3, 4, 5, 6, 7, 8, 9, 1, 0. At least two number plates 26 should bear each numeral in the sequence 1, 2, 3, 4, 5, 6, 7, 8, 9, 1, 0. More preferably there are at least thirty-three number plates 26 with at least three of the number plates 26 bearing each numeral from the sequence, that is, there should be at least three number plates 26 bearing the numeral "1", at least three number plates 26 bearing the numeral "2", at least three numeral plates 26 bearing the numeral "3", etc, as best seen in FIG. 2.

Referring to FIG. 1, in the preferred embodiment a quantity of indicia 48 are provided on the number rack 22 near each number recess 24. The quantity of indicia 48 near each number recess corresponds to the numeral 28 on the number plate 26 which fits within the respective number recess 24 in order to indicate which number recess 24 will receive which number plate 26. Referring to FIG. 10, a quantity of indicia 50 is also provided on each number plate 26. The quantity of indicia 50 on each number plate 26 corresponds to the numeral 28 borne by the number plate 26 in order to indicate what numeral 28 is borne by the number plate 26. Preferably, the number recesses 24 are arranged in ascending numerical sequence beginning with either the numeral "0" or the numeral "1", in order to demonstrate the conventional sequence of Arabic numbers. Most preferably, as illustrated in FIG. 1, the number recesses 24 are arranged in ascending numerical sequence beginning with numeral "1". Therefore, there is one indicia 48 near the first or leftmost number recess 24, two indicia 48 near the second number recess 24, three indicia near the third number recess from the left, no indicia near the right-6most or last number recess 24 which receives the numeral "0", etc. Similarly, there is one indicia 50 on the number plates 26 bearing the numeral "1", two indicia 50 on the number plates 26 bearing the numeral "2", three indicia 50 on the number plates 26 bearing the numeral "3", zero indicia 50 on the number plate 26 bearing the numeral "0", etc. The number recess 24 which receives the second number plate 46 bearing the numeral "1" has ten indicia near it. The number plate 26 bearing the second numeral "1", indicative of a ten's digit, also bears ten indicia 50.

In the preferred embodiment, as illustrated in FIGS. 1 and 10, the indicia 48 are located below the number recesses 24 on the number rack 22 and are located on the reverse side 52 of the number plates 26 from the numeral 28. The indicia may be stars, crosses, asterisks, bars, etc. In the preferred embodiment, as illustrated in FIGS. 1 and 10, the indicia are dots 48, 50. The indicia 48, 50 allow a user who can count but does not recognize numerals to count the indicia in order to determine the numeral borne by a number plate 26 or to determine which number plate 26 belongs in a particular number recess 24.

Referring to the example of FIG. 1, preferably the unique shape of each number recess 24 is provided by a uniquely located protuberance 54 in the number recess 24. Similarly, each number plate 26 bearing a different numeral 28 contains a uniquely located indentation 56, best seen in FIG. 6. The protuberances 54 and indentations 56 allow each number plate 26 bearing a different numeral 28 to be matched or fitted to and received by only one number recess 24 while at the same time allowing all number plates 26 bearing the same or identical numeral 28 to be matched or fitted to and received by the same number recess 24 in the number rack 22. A slot 58, or equivalent access, is also provided in the number rack 22 along one side of each number recess 24 to allow a user to insert a finger or other instrument and remove the number plates 26 from the number recesses 24.

Referring to the example of FIGS. 3 and 5, in the preferred embodiment, each operator recess 32 of the operator rack 30 has a unique shape. Each operator plate 34 bearing a different mathematical operator 36 also has a unique shape, and each operator plate 34 bearing a different mathematical operator 36 is uniquely shaped to placeably fit within only one operator recess 32. All of the operator plates 34 bearing the same operator 36 will fit within the same operator recess 32, i.e., if there are three operator plates 34 bearing the mathematical operator plus (+), three operator plates bearing the mathematical operator minus (−), etc., each of the operator plates 34 bearing the identical mathematical operator 36 will fit into the same operator recess 32. As with the number recesses 24 of FIG. 2, the operator recesses 32 may be made with sufficient depth that multiple operator plates bearing identical operators may be stacked, or placed one on top of another, in the operator recesses 32 with the operator 36 of the top operator plate 34 in full display (as exemplified in FIGS. 3 and 5).

Referring to FIGS. 3, 5, 8, 9, preferably, each operator recess 32 in the operator rack 30 contains a uniquely located protuberance 60 and each operator plate 34 bearing a different operator 36 contains a uniquely located indentation 62. The protuberances 60 and indentations 62 are used to uniquely shape the operator plates 34 and operator recesses 32 such that each operator plate 34 bearing a different operator 36 is matched or fitted to and received by only one operator recess 32 in the operator rack 30 and all operator plates 34 bearing the same operator 36 are matched or fitted to and received by the same operator recess 32 in the operator rack 30. At least five different mathematical operators, i.e., plus (+), minus (−), multiplication (×), division (÷), and equals (=) may be used with the mathematics education device 20, depending upon the specific application, as further discussed below. The number of operator recesses 32 in the practice rack 38 should correspond to the number of different mathematical operators 36. A slot 58, or equivalent access, is provided in the practice rack 30 along one side of each operator recess 32 to allow a user to insert a finger or other instrument and remove the operator plates 34 from the operator recesses 32.

Referring to the example of FIGS. 3 and 5, in the preferred embodiment the practice rack 38 has at least three number practice recesses 40 and at least one operator practice recess 42. Each number practice recess 40 is shaped to receive any of the number plates 26 and each operator practice recess 42 is shaped to receive any of the operator plates 34. Preferably, the number practice recesses 40 are without protuberances so that any number practice recess 40 in the practice rack 38 will receive any number plate 26. Similarly, the operator practice recesses 42 in the practice rack 38 are without protuberances so that any operator practice recess 42 will receive any operator plate 34. Preferably, a slot 58, or similar access, is provided in the practice rack 38 along one side of each number practice recess 40 and each operator practice recess 42 to allow a user to insert a finger or other instrument and remove the number plates 26 and operator plates 34 from the number practice recesses 40 and operator practice recesses 42, respectively.

In the preferred embodiment, referring to FIGS. 3 and 5, there are two types of practice racks 38, the two types being a vertical practice rack 64 and a horizontal practice rack 66. Referring to FIG. 5, the vertical practice rack 64 has at least three number practice recesses 40 and at least one operator practice recess 42 arranged for vertical addition, subtraction, multiplication, and division calculations. In the illustrated embodiment, there are seven number practice recesses 40 arranged in three rows and three columns, with two number practice recesses 40 in each of the two upper rows and three number practice recesses 40 in the lowermost row. This quantity of number practice recesses 40 will allow the most rudimentary mathematical operations with the simplest numbers and is particularly designed to educate young children in the basic principles of addition, subtraction, multiplication, division, as well as the base ten upon which our mathematical system is founded. The number of rows or columns, or both, may be increased to allow for more advanced training and calculations. Similarly, individual number plates 26 may be provided with multiple digit numerals, e.g., numbers in the tens, hundreds, thousands, etc., if so desired. In the embodiment of FIG. 5, only four different mathematical operators 36 are illustrated, there is no equals sign (=) because of the bar 68 which is permanently embossed on the practice rack 38. An operator practice recess 42 (not illustrated) may be added to the left of the lowermost row of number practice recesses 40 if so desired and a fifth operator recess 42 may be added to the operator rack 30 to accommodate an operator plate 34 bearing an equal sign (=).

Referring to the example of FIG. 3, in th preferred embodiment, the horizontal practice rack 66 also has at least three number practice recesses 40 and at least one operator practice recess 42 arranged for horizontal addition, subtraction, multiplication, and division calculations. Preferably, as illustrated, there are seven number practice recesses 40. As viewed in FIG. 3, the number practice recesses 40 are grouped with two number practice recesses 40 in the leftmost group, two number practice recesses 40 in the middle group, and three number practice recesses 40 in the rightmost group, with an operator practice recess 42 between the leftmost group and the middle group, and between the middle group and the rightmost group. This arrangement is selected to allow for the most rudimental mathematical or arithmetic calculations. The leftmost operator practice recess 42 is intended to receive one of the four mathematical operators (+, −, ×, ÷) and the rightmost operator practice recess 42 is intended to receive an equals sign (=). The equals sign may be permanently embossed on the practice rack 66, although allowing the user to select and place an operator plate 34 bearing the equals sign (=) forces the user to be consciously aware of the correct location and function of the equals sign. The number of number practice recesses 40 may be increased within each grouping and the number of groupings as well as operator practice recesses 42 may be increased to facilitate more complex or advanced educational operations. As mentioned supra, the numerals 28 borne by the number plates 26 may be expanded to include multiple digit numerals.

Referring to FIGS. 5, 7, and 9, in the preferred embodiment, blank number plates 70 and blank operator plates 72 are provided to be placed in the number practice recesses 40 and operator practice recesses 42 of the practice racks 64, 66 when the device 20 is not in use. Each number practice recess 40 is uniquely shaped to receive all of the number plates 26, but only one of the blank number plates 70. Each blank number plate 70 is uniquely shaped to fit within only one of the number practice recesses 40. This is accomplished by providing a protuberance 74 on each blank number plate 70 in a unique position and providing an indentation 76 on each number practice recess 64 in a unique position. The protuberances 74 and indentations 76 are arranged so that each number practice recess 40 will receive only one unique shape of blank number plate 70. Similarly, each blank operator plate 72 has a protuberance 78 in a unique position and each operator practice recess 42 has an indentation 80 in a unique location. The protuberances 78 and indentations 80 are arranged such that each operator practice recess 42 will receive only one unique shape of blank operator plate 72.

In the illustrated preferred embodimentof FIGS. 1, 3, and 5, the mathematics education device 20 is depicted as being comprised of three separate components, i.e., a number rack 22, a vertical practice rack 64, and a horizontal practice rack 66. These individual components may be combined into one integral unit or may be otherwise arranged to suit a particular use or user. For example, each of the vertical practice rack 64 and horizontal practice rack 66 may be integrally combined with their own number rack 22; the operator rack 30 may be located on the number rack 22 rather than the vertical and horizontal practice racks 64, 66; etc.

Preferably, the education device 20 is made of a rigid material which is light enough to be easily transported, which is inexpensive, which may be inexpensively worked or shaped to create the device 20, and which is readily available. The prototypes are made of wood and it is recognized that there are many other suitable materials and combinations of materials, such as, plastic and polymers, metals, fiberglass, wood and chemical composites, etc. The individual pieces of the device 20 may be hand cut, machine cut, or formed, such as with an injection molding process.

Two different methods of storing and displaying the mathematics educating device 20 have been used with the prototype and are not illustrated in the attached drawings. In the first method, a hinged cover is added to each of the racks 22, 64, 66. The cover is hinged along the top edge of each rack 22, 64, 66 and may be rotated from one position in which the hinged cover may be latched and cover the number recesses 24, 40 to a second position in which the hinged cover is rotated away from the number recesses 24, 40 and operator recesses 32, 42 to the back side of the rack 22, 64, 66. When the hinged cover is rotated to the back side of the rack 22, 64, 66 it may be used as a supporting easel or stand to "prop up" the rack. The other method of storing the device amounts to simply clipping a solid cover over the face of the racks to cover the number recesses 24, 40 and operator recesses 32, 42. The preferred covers are clipped to the racks 22, 64, 66 with "C"-type clips or clamps, although many equivalent fasteners are available and will suffice. The number plates 26, operator plates 34 and blank plates 70, 72 are placed in their fitted recesses before the racks are covered with either method of covering. An easel may be provided with projecting dowel pins or trays to support the mathematics educating device 20 for ease of use and display.

The following is an operational example of the device 20. A child who is able to count from one to ten is given a problem in addition, for example adding three and two. He proceeds to the number rack 22 where he is able to count the indicia 48 on the number rack 22 if he cannot recognize the numeral "3" at once. He then selects from the number rack 22 the number plate 26 bearing three indicia and the numeral "3" and carries the selected plate 26 to the vertical practice rack 64 where he removes a blank number plate 70 from the right-uppermost number practice recess 40 and replaces it with the number plate 26 bearing the numeral "3". He performs similarly in choosing and placing the number plate 26 bearing the numeral "2" beneath the properly placed number plate 26 bearing the numeral "3". He now must choose the proper mathematical operator 36 and therefore must choose the plus sign from the group of mathematical operators 36 which are housed in the operator rack 30. He is thus forced to think about and differentiate the plus sign from those representing subtraction, multiplication, and division. He chooses the mathematical operator 36, removes the blank operator plate 72 from the operator practice recess 42 and replaces it with the mathematical operator 36 (plus sign). If necessary he can count the indicia 50 again, this time counting all of them on the reverse side of the number plates 26. The indicia 50 total to the quantity five. He then returns to the number rack 22 and selects the number plate 26 bearing the numeral "5". If he cannot recognize the numeral "5", he may count the indicia 48 on the number rack 22 to identify the numeral "5". He then takes the number plate 26 bearing a numeral "5", removes the blank operator plate 72 from the right-lowermost row of the vertical practice rack 64 and replaces it with the solution to his problem. Once the problem in addition or subtraction has been solved, the reciprocity of addition and subtraction becomes apparent. This may be demonstrated by interchanging the additive numbers in order to demonstrate that their positions make no difference in the addition or by placing the answer in the uppermost row, replacing the "plus" operator plate 34 with a "minus" operator plate 34 and demonstrating how the same numerals cooperate in additive and subtractive relationships. Similarly, the reciprocity of multiplication and division can be demonstrated. When it is time to clean up or replace the mathematics educating device 20 to its storage position the number plates 26 may only be placed in the proper and organized number recesses 24 because of the unique, coded shaping of the number recesses and number plates. Similarly, the operator plates 34 may only be replaced in the proper and organized operator recesses 32 because of the unique, coded shaping of the operator plates 34 and operator recesses 32. Also, the blank number plates 70 and blank operator plates 72 may only be replaced in their proper number practice recesses 40 and operator practice recesses 42, respectively, because of the unique, coded shaping, discussed supra.

While the invention has been described with a certain degree of particularity, it is manifest that many changes may be made in the details of construction and the arrangement of components without departing from the spirit and scope of this disclosure. It is to be understood that the invention is not limited to the embodiments set forth herein for purposes of exemplification, but is to be limited only by the scope of the attached claim or claims including the full range of equivalency to which each element thereof is entitled.

What is claimed is:

1. A mathematics educating device, comprising:
   a number rack having a plurality of number recesses, each number recess having a unique shape;
   a plurality of number plates, each number plate bearing a numeral, each number plate bearing a different numeral being uniquely shaped to fit within only one number recess with all number plates bearing the same numeral fitting within the same number recess;
   an operator rack having a plurality of operator recesses;
   a plurality of operator plates, each operator plate bearing a different mathematical operator, each operator plate fitting within an operator recess; and
   a practice rack having at least three number practice recesses and at least one operator practice recess arranged for addition, subtraction, multiplication, and division, each number practice recess being shaped to receive any of the number plates, each operator practice recess being shaped to receive any of the operator plates.

2. The device of claim 1:
   wherein each operator recess is further defined as having a unique shape; and;
   wherein each operator plate bearing a different mathematical operator is uniquely shaped to fit within only one operator recess with all operator plates bearing the same operator fitting within the same operator recess.

3. The device of claim 1:
   wherein the plurality of number recesses is further defined as being ten number recesses; and
   wherein the plurality of number plates is further defined as being at least ten number plates, each number plate bearing one numeral selected from the sequence 0, 1, 2, 3, 4, 5, 6, 7, 8, 9.

4. The device of claim 1:
   wherein the plurality of number recesses is further defined as being eleven number recesses; and
   wherein the plurality of number plates is further defined as being at least eleven number plates; each number plate bearing one numeral selected from the sequence 1, 2, 3, 4, 5, 6, 7, 8, 9, 1, 0; the number plates bearing the numeral 1 occurring first in the sequence being used to indicate the numeral 1; the number plates bearing the numeral 1 occurring second in the sequence being used to indicate a ten's digit.

5. The device of claim 4, further comprising:
   at least twenty-two number plates, each number plate bearing one numeral selected from the sequence 1, 2, 3, 4, 5, 6, 7, 8, 9, 1, 0; at least two of the number plates bearing each numeral from the sequence 1, 2, 3, 4, 5, 6, 7, 8, 9, 1, 0.

6. The device of claim 1, further comprising:
   a quantity of indicia on the number rack near each number recess, the quantity of indicia near each number recess corresponding to the numeral on the number plate which fits within the respective number recess in order to indicate which number recess will receive which number plate.

7. The device of claim 1, further comprising:
   a quantity of indicia on each number plate, the quantity of indicia on each number plate corresponding to the numeral borne by the number plate in order to indicate what numeral is borne by the number plate.

8. The device of claim 1, further comprising:
   a quantity of indicia on the number rack near each number recess, the quantity of indicia near each number recess corresponding to the numeral on the number plate which fits within the respective number recess in order to indicate which number recess will receive which number plate; and
   a quantity of indicia on each number plate, the quantity of indicia on each number plate corresponding to the numeral borne by the number plate in order to indicate what numeral is borne by the number plate.

9. The device of claim 8:
   wherein the plurality of number recesses is further defined as being eleven recesses; and
   wherein the plurality of number plates is further defined as being at least eleven number plates; each number plate bearing one numeral selected from the sequence 1, 2, 3, 4, 5, 6, 7, 8, 9, 1, 0; one number plate bearing the numeral 1 being used to indicate the numeral one and therefor bearing one indicia; the other number plate bearing the numeral 1 being used to indicate a ten's digit and therefore bearing ten indicia; the number recess which will receive the number plate bearing the numeral 1 and one indicia also bearing one indicia; the number recess which will receive the number plate bearing the numeral 1 and ten indicia also bearing ten indicia.

10. The device of claim 1:
    wherein each number recess in the number rack contains a uniquely located protuberance and each number plate bearing a different numeral contains a uniquely located indentation whereby each number plate bearing a different numeral is matched to and received by only one number recess and all number plates bearing the same numeral are matched to and received by the same number recess in the same number rack; and wherein each operator recess in the operator rack contains a uniquely located protuberance and each operator plate bearing a different operator contains a uniquely located indentation whereby each operator plate bearing a different operator is matched to and received by only one operator recess in the operator rack and all operator plates bearing the same operator are matched to and received by the same operator recess in the operator rack; and wherein the number practice recesses in the practice rack are without protuberances so that any number practice recess in the practice rack will receive any number plate; and wherein the operator practice recesses in the practice rack are without protuberances so that any operator practice recess in the practice rack will receive any operator plate.

11. The device of claim 1:
wherein the number practice recesses and at least one operator practice recess are further defined as being arranged for vertical addition, subtraction, multiplication, and division calculations.

12. The device of claim 1:
wherein the number practice recesses and at least one operator practice recess are further defined as being arranged for horizontal addition, subtraction, multiplication, and division calculations.

13. A mathematics educating device, comprising:
a number rack having a plurality of number recesses, each number recess having a unique shape;
a plurality of number plates, each number plate bearing a numeral, each number plate bearing a different numeral being uniquely shaped to fit within only one number recess with all number plates bearing the same numeral fitting within the same number recess;
an operator rack having a plurality of operator recesses, each operator recess having a unique shape;
a plurality of operator plates, each operator plate bearing a mathematical operator, each operator plate bearing a different operator being uniquely shaped to fit within only one operator recess with all operator plates bearing the same operator fitting within the same operator recess; and
a practice rack having at least three number practice recesses and at least one operator practice recess arranged for addition, subtraction, multiplication, and division, each number practice recess being shaped to receive any of the number plates, each operator practice recess being shaped to receive any of the operator plates.

14. A mathematics educating device, comprising:
a number rack having eleven number recesses, each number recess having a unique shape;
at least eleven number plates, each number plate bearing one numeral selected from the sequence 1, 2, 3, 4, 5, 6, 7, 8, 9, 1, 0; each number plate bearing a different numeral being uniquely shaped to fit within only one number recess with all number plates bearing the same numeral fitting within the same number recess; the number plates bearing the numeral 1 occurring first in the sequence being used to indicate the numeral 1; the number plates bearing the numeral 1 occurring second in the sequence being used to indicate a ten's digit;
an operator rack having a plurality of operator recesses, each operator recess having a unique shape;
a plurality of operator plates, each operator plate bearing a mathematical operator, each operator plate bearing a different operator being uniquely shaped to fit within only one operator recess with all operator plates bearing the same operator fitting within the same operator recess;
a quantity of indicia on the number rack near each number recess, the quantity of indicia near each number recess corresponding to the numeral on the number plate which fits within the respective number recess in order to indicate which number recess will receive which number plate;
a quantity of indicia on each number plate, the quantity of indicia on each number plate corresponding to the numeral borne by the number plate in order to indicate which numeral is borne by the number plate; and
a practice rack having at least three number practice recesses and at least one operator practice recess arranged for addition, subtraction, multiplication, and division, each number practice recess being shaped to receive any of the number plates, each operator practice recess being shaped to receive any of the operator plates.

* * * * *